(12) United States Patent
Nath et al.

(10) Patent No.: US 9,014,674 B2
(45) Date of Patent: Apr. 21, 2015

(54) APPARATUS AND METHOD FOR TRANSMITTING INFORMATION IN VOICEMAIL

(71) Applicant: Samsung Electronics Co. Ltd., Suwon-si, Gyeonggi-do (KR)

(72) Inventors: Papiya Nath, Santa Clara, CA (US); Howard Lee, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/744,095

(22) Filed: Jan. 17, 2013

(65) Prior Publication Data

US 2014/0199974 A1    Jul. 17, 2014

(51) Int. Cl.
*H04M 11/10* (2006.01)
*H04M 3/533* (2006.01)

(52) U.S. Cl.
CPC .... *H04M 3/53366* (2013.01); *H04M 2203/303* (2013.01)

(58) Field of Classification Search
USPC ............ 455/413, 412.1; 379/67.1–72, 80–85, 379/88.16, 88.25
See application file for complete search history.

(56) References Cited

U.S. PATENT DOCUMENTS

| | | | |
|---|---|---|---|
| 6,408,177 B1 * | 6/2002 | Parikh et al. ................ | 455/414.4 |
| 7,203,286 B1 * | 4/2007 | Brockenbrough et al. ..... | 379/76 |
| 2006/0099908 A1 * | 5/2006 | Bulthuis et al. .............. | 455/3.06 |
| 2008/0167010 A1 * | 7/2008 | Novick et al. ................. | 455/413 |

* cited by examiner

*Primary Examiner* — Chuong A Ngo
(74) *Attorney, Agent, or Firm* — Jefferson IP Law, LLP

(57) ABSTRACT

An apparatus and method for transmitting a voicemail from a mobile terminal are provided. The method includes transmitting a voicemail header comprising predefined voicemail information, receiving a voicemail message content from a user of the mobile terminal, and transmitting the voicemail message content.

38 Claims, 5 Drawing Sheets

APPARATUS AND METHOD FOR TRANSMITTING INFORMATION IN VOICEMAIL

BACKGROUND OF THE INVENTION

1. Field of the Invention

The present invention relates to an apparatus and method for transmitting information in voicemail. More particularly, the present invention relates to an apparatus and method for transmitting preconfigured or predefined information in a voicemail.

2. Description of the Related Art

Voicemail systems are systems that are configured to allow a caller to leave a message for a recipient. For example, if a recipient is unavailable or does not wish to receive a call from the caller, then the caller will be forwarded to an automated voicemail system which allows the caller to leave a short message for the recipient. Accordingly, voicemail systems allow the recipient to pick up (e.g., receive) its messages from its designated "voicemail inbox" at the recipient's convenience.

Generally, when the caller places a call and is directed to a recipient's voicemail, the caller is prompted to leave a message. For example, callers have to repeat a sentence that includes the name of the caller and a phone number at which the caller may be reached. As an example, basic requirements of a voicemail are leaving a name and callback number, repeating a callback number so as to provide the recipient a second chance to confirm that the recipient has recorded the correct callback number, and speaking slowly and clearly. As a further example, callers who are non-native speakers may have to mask their natural accents to ensure that the callers' accents are understood by the recipient.

Some voicemail systems are configured to tag messages with the caller ID. However, the caller may not know whether the recipient uses such a voicemail system and thus may not know whether the recipient's voicemail system has the capability to tag the caller's message with its caller ID. Consequently, the caller must still leave the same general information (e.g., name, and callback number) so as to ensure that the recipient receives all relevant information for contacting the caller at the recipient's convenience.

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Accordingly, there is a need for an apparatus and method for transmitting preconfigured or predefined information in a voicemail.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for transmitting preconfigured or predefined information in a voicemail In accordance with an aspect of the present invention, a method for transmitting a voicemail from a mobile terminal is provided. The method includes transmitting a voicemail header and/or voicemail footer comprising predefined voicemail information, receiving a voicemail message content from a user of the mobile terminal, and transmitting the voicemail message content.

In accordance with another aspect of the present invention, a terminal for transmitting a voicemail is provided. The mobile terminal includes an input unit, an audio processing unit, a communication unit for transmitting information to at least one of a recipient mobile terminal and a voicemail server, and at least one controller for transmitting a voicemail header comprising predefined voicemail information; for receiving a voicemail message content from a user of the mobile terminal; and for transmitting the voicemail message content.

In accordance with another aspect of the present invention, a method for transmitting a voicemail from a mobile terminal is provided. The method includes transmitting a voicemail footer comprising predefined voicemail information, receiving a voicemail message content from a user of the mobile terminal, and transmitting the voicemail message content.

In accordance with another aspect of the present invention, a method for transmitting a voicemail from a mobile terminal is provided. The method includes transmitting a voicemail message comprising predefined voicemail information, wherein the voicemail message is entirely composed predefined voicemail information such that a user of a mobile terminal is not required to record any portion of the voicemail message.

In accordance with another aspect of the present invention, a method for transmitting a voicemail from a mobile terminal is provided. The method includes transmitting a voicemail message based on at least one predefined voicemail template configured by a user of the mobile terminal before an originating call from which transmission of the voicemail arises.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
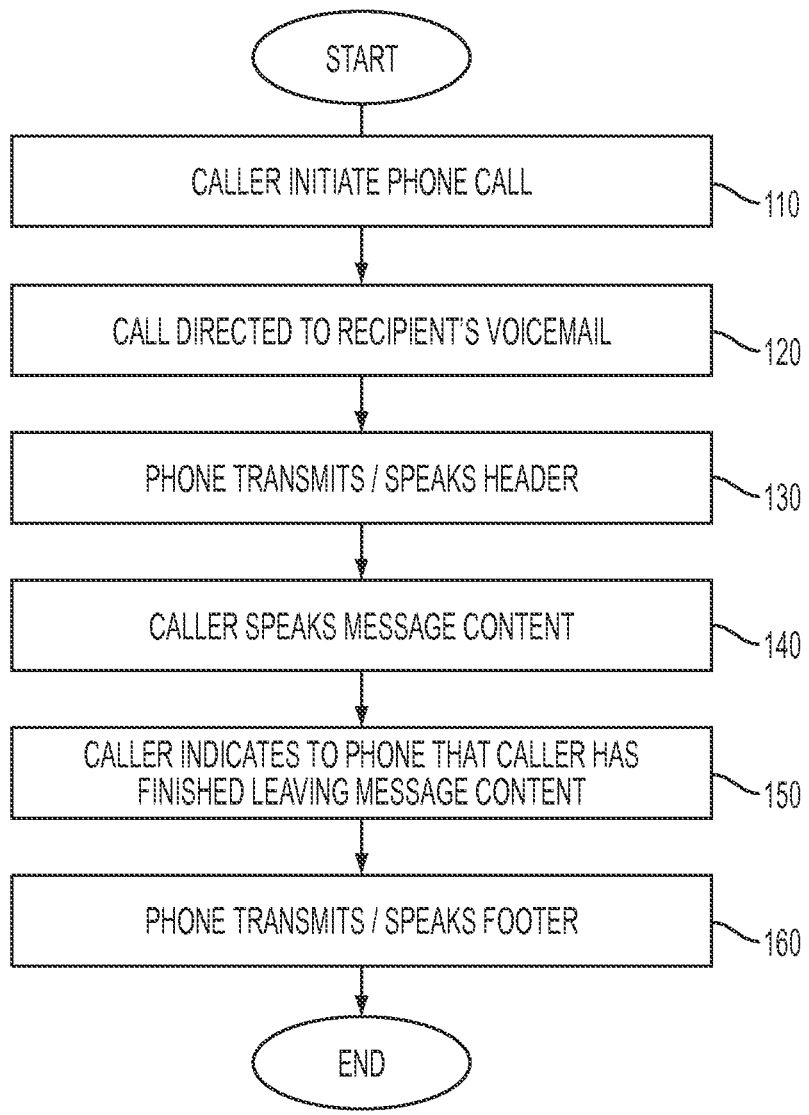
FIG. 1 is a flowchart illustrating a method of synchronously transmitting a voicemail according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a non-exhaustive illustration only, a terminal described herein may refer to mobile devices such as a phone, a cellular phone, a personal digital assistant (PDA), a portable lap-top Personal Computer (PC), a tablet PC, and devices such as a desktop PC, a high definition television (HDTV), like capable of wireless communication or network communication consistent with that disclosed herein.

For purposes of description of exemplary embodiments of the present invention, a terminal will hereinafter be referred to as a mobile terminal.

Exemplary embodiments of the present invention include an apparatus and method for transmitting preconfigured or predefined information in a voicemail. For example, exemplary embodiments of the present invention provide for transmission of a more efficient and relevant voicemail message. As another example, exemplary embodiments of the present invention provide for transmission of a voicemail information with reduced noise. For example, if a caller is in a noisy environment, the preconfigured or predefined information associated with a voicemail may be transmitted such that rather than the caller speaking such information into the terminal in noisy or other disruptive conditions, the caller may transmit a preconfigured or predefined information that has been input under more preferable conditions or environments. This helps the recipient more clearly understand the voicemail, and more particularly, the important information that has been preconfigured or predefined (e.g., caller name, caller phone number, and the like). According to exemplary embodiments of the present invention, the preconfigured or predefined information may be configured according to a template (e.g., which may be predefined). For example, the template may include using a preconfigured or predefined voicemail header, voicemail footer, and the like. As another example, the template may include using interleaved recorded and spoken portions of a voicemail. As yet another example, the template may include using a plurality of recorded portions of a voicemail strung together to comprise a portion of a voicemail message or an entire voicemail message.

According to exemplary embodiments of the present invention, a user may store predefined voicemail headers in a mobile terminal. The predefined voicemail headers may be manually selected by the user or automatically selected by the mobile terminal based on the context at the time of transmission of the voicemail message. According to exemplary embodiments of the present invention, a predefined voicemail footer may also be manually selected by the user or automatically selected by the mobile terminal based on the context at the time of transmission of the voicemail message.

According to exemplary embodiments of the present invention, the mobile terminal may transmit a voicemail header and/or voicemail footer synchronously or asynchronously.

According to exemplary embodiments of the present invention, the mobile terminal may be configured such that the voicemail header and/or voicemail footer corresponds to a recording of a user's voice or a synthesized speech of the information to be transmitted. For example, the voicemail header and/or voicemail footer may be saved to the mobile terminal as text which the mobile terminal converts to audio. Such an example may assist those callers with accents to leave voicemail messages in a format more understandable by a recipient in the recipient's native language. The voicemail header and voicemail footer may be fully customizable such that the user can provide any information it desires.

According to the exemplary embodiments of the present invention, each of the configured voicemail headers and/or voicemail footers may have configuration settings associated therewith. The configuration settings may provide an association with contexts during which each corresponding voicemail header and/or voicemail footer is to be used.

For example, according to exemplary embodiments of the present invention, a voicemail header and/or voicemail footer may be associated with a certain contact or contact group such that the mobile terminal automatically determines whether the recipient is a defined contact or belongs to a defined contact group and thereafter determines whether any of the predefined voicemail headers and/or voicemail footers are associated with such a contact or contact group, and if a voicemail header and/or voicemail footer is associated with the contact or contact group (e.g., associated the recipient), then the mobile terminal may automatically select the corresponding voicemail header and/or voicemail footer, or may indicate to the user such an association when the user is manually selecting which voicemail header and/or voicemail footer to use.

As another example, according to exemplary embodiments of the present invention, a voicemail header and/or voicemail footer may be associated with a certain time of day or day of the week on which the voicemail is being transmitted. For example, a mobile terminal may have stored thereon a voicemail header and/or voicemail footer to be used in the context of business hours and a voicemail header and/or voicemail footer to be used for personal calls after business hours. As an example, the voicemail header and/or voicemail footer associated with business hours may be distinguished from the voicemail header and/or voicemail footer based on the formalities of the preconfigured information and/or the caller's contact information at which the recipient can return a call. According to exemplary embodiments of the present invention, the mobile terminal may determine the time of day or the day of the week on which the voicemail is being transmitted and thereafter determine whether the mobile terminal has stored there on any voicemail headers and/or voicemail footers associated with that time of day or day of the week. If the mobile terminal has stored thereon a voicemail header and/or voicemail footer associated with the time of day or day of the week, then the mobile terminal may automatically select the corresponding voicemail header and/or voicemail footer, or may indicate to the user such an association when the user is manually selecting which voicemail header and/or voicemail footer to use.

As another example, according to exemplary embodiments of the present invention, a voicemail header and/or voicemail footer may be associated with a certain environment of the mobile terminal in which the mobile terminal is present while the voicemail is being transmitted. For example, the mobile terminal may determine its geographic location and a corresponding native language of that geographic location. Accordingly, if the mobile terminal has stored thereon a voicemail header and/or voicemail footer stored in text format, the mobile terminal may automatically select the corresponding text-based voicemail header and/or voicemail footer and convert such a voicemail header and/or voicemail footer into the native language of the region. As another example, the mobile terminal may determine the geographic location of the recipient (e.g., based on the recipient's phone number) and thereafter convert a corresponding text-based voicemail header and/or voicemail footer into audio in the recipient's native language. As another example, the mobile terminal may determine whether the mobile terminal has stored thereon contact information for the recipient, and whether the contact information has an indication of the recipient's native language, and if so, then may use such information to convert a corresponding text-based voicemail header and/or voicemail footer into audio in the recipient's native language.

According to exemplary embodiments of the present invention, a preconfigured voicemail header and/or voicemail footer may be stored locally on the mobile terminal or on a server. As an example, an entire voicemail message (including a voicemail header and/or voicemail footer) may be preconfigured and stored locally on the mobile terminal or on a server. In other words, a user may pre-record a generic voicemail message which may be used in all or specific contexts. The pre-recorded voicemail message may allow the user to leave a voicemail without having to input voicemail content while leaving a voicemail message.

According to exemplary embodiments of the present invention, the user of the mobile terminal may select whether to send the preconfigured or predefined information (e.g., the voicemail header and/or voicemail footer) synchronously or asynchronously. For example, the user may select whether to use a synchronous or asynchronous transmission at the time the user is forwarded to a recipient's voicemail service. As another example, the user may select whether to use a synchronous or asynchronous transmission based on configuration settings of the mobile terminal.

According to exemplary embodiments of the present invention, a preconfigured voicemail header and/or voicemail footer may be input or recorded according to a template system. For example, a terminal may provide a user with a template with which the user may input information corresponding to each information field associated with the voicemail header and/or voicemail footer (e.g., caller name, caller number, contextual information associated with the contexts during which the specific voicemail header and/or voicemail footer is to be used, and the like). This may permit an easier input and recording of a voicemail header and/or voicemail footer when the voicemail header and/or voicemail footer includes a more complex or comprehensive sequence of information to be input or recorded.

According to exemplary embodiments of the present invention, a voicemail header and/or voicemail footer may be input or recorded as text-based information (e.g., a text message). The text-based information may be synthesized into speech at a later time such as, for example, when the caller is leaving a voicemail message and that particular voicemail header and/or voicemail footer is being processed and transmitted to the recipient's voicemail service.

FIG. 1 is a flowchart illustrating a method of synchronously transmitting a voicemail according to an exemplary embodiment of the present invention.

According to exemplary embodiments of the present invention, if the mobile terminal is in a synchronous operation, then upon being forwarded to a recipient's voicemail service (e.g., transferred to leave a message in the recipient's voicemail inbox) a user of the mobile terminal (e.g., the caller) waits while the mobile terminal transmits information (e.g., the voicemail header) before the caller leaves a personalized message (e.g., a voicemail message content). After the caller has left the voicemail message content, the mobile terminal may transmit the voicemail footer before disconnecting the call. As an example, the user may provide an input to the mobile terminal corresponding to an indication of an end of the voicemail message content. For example, the user may press a key on the mobile terminal which signifies that the user has finished leaving the voicemail message content.

Referring to FIG. 1, in step 110, the caller initiates a call with a recipient. In step 120, the call is forwarded to the recipient's voicemail service such that the caller may leave a voicemail in the recipient's voicemail inbox.

The mobile terminal then transmits or speaks the voicemail header in step 130. After the voicemail header has been transmitted or spoken by the mobile terminal, the caller speaks or leaves the voicemail message content in step 140. As an example, the voicemail header may correspond to a static portion of a voicemail message and the voicemail message content may correspond to a dynamic portion of the voicemail message content. For example, the voicemail header is preconfigured and stored in the mobile terminal to be transmitted so as to save the caller the time and inconvenience of having to speak the standard information associated with the caller's greeting, name, and callback number. At the time of being directed to the recipient's voicemail service, the caller may be prompted by the mobile terminal as to which voicemail header should be transmitted or spoken. As an example, the caller's message may be blank such that the entire voicemail comprises the voicemail header and/or voicemail footer.

After the caller has completed speaking or leaving the voicemail message content in step 140, the caller indicates to the mobile terminal that the caller has finished leaving the voicemail message content in step 150. For example, the caller may press a key corresponding to an indication that the caller has finished leaving the voice mail message content. As another example, the caller may press a key corresponding to an indication that the mobile phone is to begin transmission or speaking of the voicemail footer.

In step 150, the mobile terminal transmits or speaks the voicemail footer. For example, upon receiving the indication by the caller that the caller has finished leaving the voicemail content message, the mobile terminal initiates transmission or speaking of the voicemail footer. As an example, similar to the voicemail header, the voicemail footer may preconfigured and stored in the mobile terminal to be transmitted so as to save the caller the time and inconvenience of having to speak the standard information associated with the caller's greeting, name, and callback number. For example, at the time of being directed to the recipient's voicemail service, the caller may be prompted by the mobile terminal as to which voicemail footer and its associated configuration settings should be transmitted or spoken. As another example, the caller may be prompted by the mobile terminal as to which voicemail footer should be transmitted or spoken after or at the time of the caller providing indication to the mobile terminal that the caller is finished leaving the voicemail content message.

After the mobile terminal has completed transmission of the voicemail footer, the mobile terminal disconnects the call.

Figure 2:
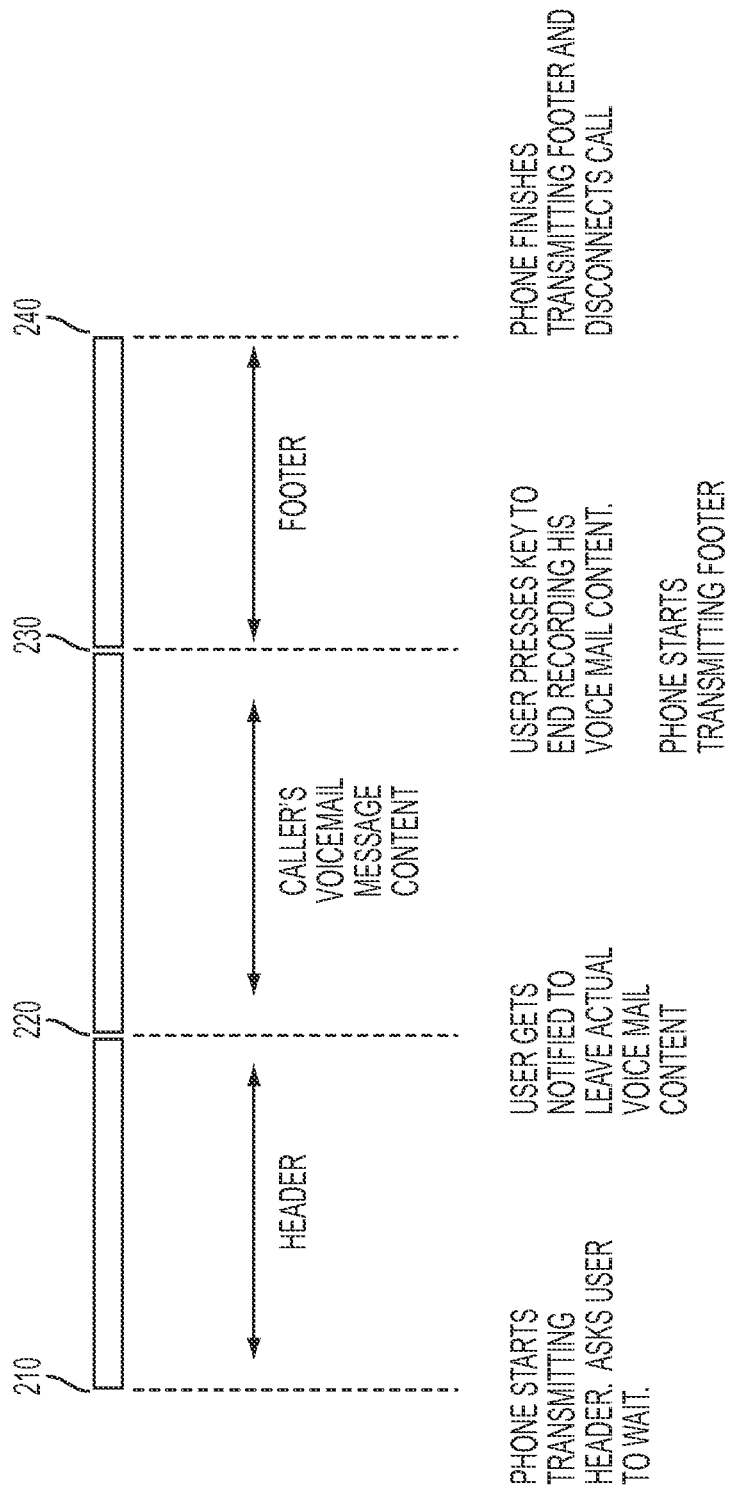
FIG. 2 illustrates a signal flow for synchronous transmission of a voicemail according to an exemplary embodiment of the present invention.

FIG. 2 illustrates a signal flow for synchronous transmission of a voicemail according to an exemplary embodiment of the present invention Referring to FIG. 2, the mobile terminal begins transmission of the voicemail header in step 210. As an example, the mobile terminal may prompt the caller to wait until the voicemail header is transmitted before leaving or speaking the content associated with the voicemail message content.

After the mobile terminal completes transmitting the voicemail header, the mobile terminal prompts the caller to leave the voicemail message content in step 220. For example, the mobile terminal notifies the caller to leave the actual voicemail content after the voicemail header has been transmitted.

After being prompted to leave the voicemail message content in step 220, the caller leaves the voicemail message content and the mobile terminal correspondingly transmits the voicemail message content to the recipient's voicemail service.

After the caller has completed leaving the voicemail message content, the caller provides an indication to the mobile terminal that the voicemail message content is complete, in step 230. After receiving the indication that the voicemail message content is complete, the mobile terminal begins transmitting the voicemail footer.

In step 240, the mobile terminal completes transmission of the voicemail footer and disconnects the call.

Figure 3:
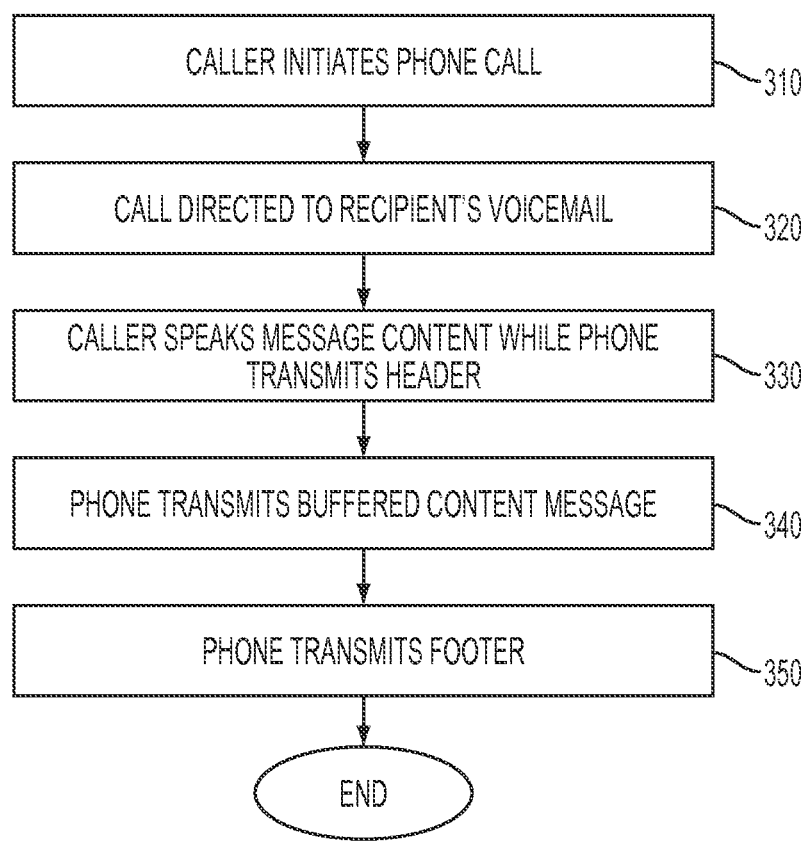
FIG. 3 is a flowchart illustrating a method of asynchronously transmitting a voicemail according to exemplary embodiments of the present invention.

FIG. 3 is a flowchart illustrating a method of asynchronously transmitting a voicemail according to exemplary embodiments of the present invention.

According to exemplary embodiments of the present invention, if the mobile terminal is in an asynchronous operation, then the caller leaves his personalized message (e.g., the voicemail message content) immediately and ends the call upon completion of the voicemail message content. In asynchronous operation, the mobile terminal buffers the voicemail message content and streams such content between transmission of the preconfigured voicemail header and voicemail footer. The mobile terminal disconnects the call automatically upon completing transmission of the voicemail (e.g., the voicemail header, the voicemail message content, and the voicemail footer).

Referring to FIG. 3, in step 310, the caller initiates a call with a recipient. In step 320, the caller is forwarded to the recipient's voicemail service such that the caller may leave a voicemail in the recipient's voicemail inbox.

In step 330, the caller then speaks or leaves the voicemail message content. According to exemplary embodiments of the present invention, the caller may select which voicemail header and/or voicemail footer to transmit as part of the voicemail. For example, the caller may select among a plurality of prestored or preconfigured voicemail headers and/or a plurality of voicemail footers based on the context. According to exemplary embodiments of the present invention, the mobile terminal may automatically select among a plurality of prestored or preconfigured voicemail headers and/or a plurality of voicemail footers based on the context.

According to exemplary embodiments of the present invention, while the caller is speaking or leaving the voicemail message content, the mobile terminal is transmitting the selected or corresponding voicemail header. Further, while the caller is speaking or leaving the voicemail message content, the mobile terminal is buffering the voicemail message content. When the caller is finished recording the voicemail message content, the caller may hang up the call. The mobile terminal will continue to transmit any of the voicemail header, the buffered voicemail message content, and the voicemail footer that remains to be transmitted before disconnecting the call.

In step 340, the mobile terminal transmits the buffered voicemail message content. For example, the mobile terminal begins transmission of the buffered voicemail message content after the mobile terminal has completed transmission of the voicemail header.

After the mobile terminal has completed transmission of the buffered voicemail message content in step 340, the mobile terminal transmits the voicemail footer in step 350. After the mobile terminal has completed transmission of the voicemail footer, the mobile terminal disconnects the call.

Figure 4:
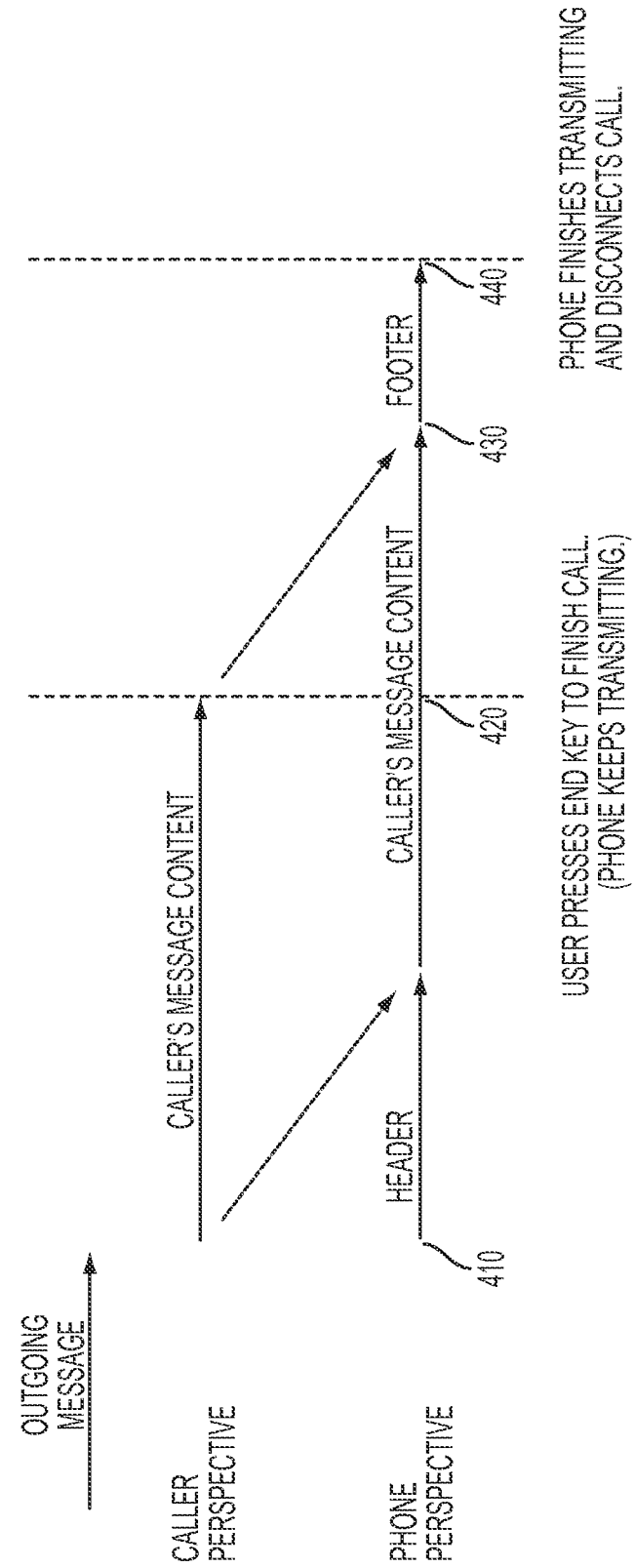
FIG. 4 illustrates a signal flow for asynchronous transmission of a voicemail according to an exemplary embodiment of the present invention.

FIG. 4 illustrates a signal flow for asynchronous transmission of a voicemail according to an exemplary embodiment of the present invention.

Referring to FIG. 4, at step 410 the mobile terminal begins transmitting the voicemail header. Concurrently, the caller begins leaving the voicemail message content. The mobile terminal buffers the voicemail message content while the caller is leaving the voicemail message content.

As illustrated in FIG. 4, after the mobile terminal has completed transmitting the voicemail header, the mobile terminal begins transmitting the buffered voicemail message content. According to exemplary embodiments of the present invention, the mobile terminal may begin transmitting the buffered voicemail message content while the caller is still leaving portions of the voicemail message content. For example, at step 420, the caller finishes leaving the voicemail message content. However, the mobile terminal is still transmitting the buffered voicemail message content. According to exemplary embodiments of the present invention, the caller may hang up the call while the mobile terminal continues to transmit any of the voicemail header, the buffered voicemail message content, and the voicemail footer that remains to be transmitted.

At step 430, the mobile terminal finishes transmitting the buffered voicemail message content. Thereafter, as illustrated in FIG. 4, the mobile terminal begins transmitting the voicemail footer.

At step 440, the mobile terminal completes transmission of the voicemail footer. Upon completion of the transmission of the voicemail footer, the mobile terminal disconnects the call.

Figure 5:
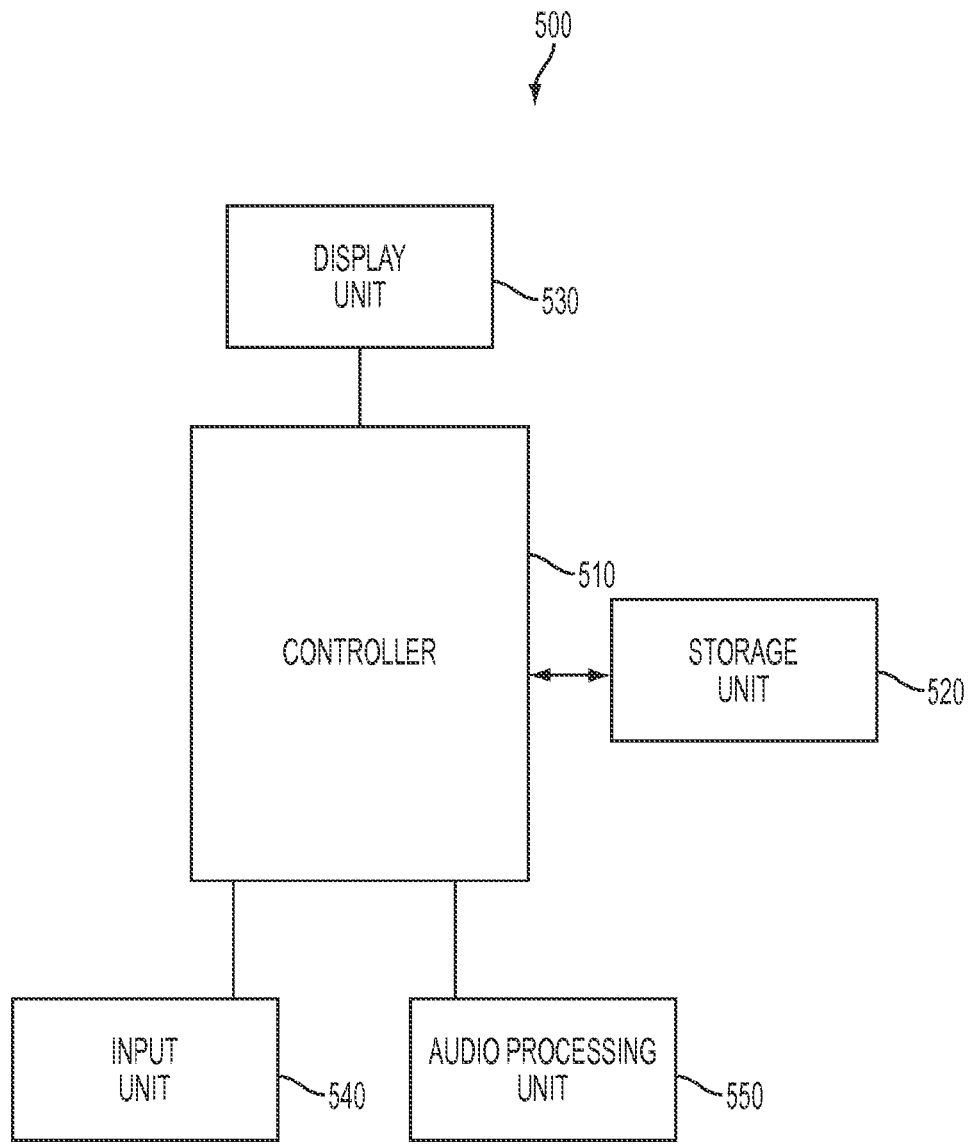
FIG. 5 is block diagram schematically illustrating a configuration of a mobile terminal according to an exemplary embodiment of the present invention.

FIG. 5 is block diagram schematically illustrating a configuration of a mobile terminal according to an exemplary embodiment of the present invention.

Referring to FIG. 5, a mobile terminal 500 according to an exemplary embodiment of the present invention includes at least one controller 510, a storage unit 520, a display unit 530, an input unit 540, an audio-processing unit 550, and a communication unit (not shown). As an example, the mobile terminal 500 having such a configuration may store at least one preconfigured voicemail header and/or voicemail footer, and may transmit a voicemail header and/or voicemail footer in a synchronous operation or an asynchronous operation when the caller is in the process of leaving a voicemail.

According to exemplary embodiments of the present invention, the mobile terminal 500 may further include various sensors for determining the environment. For example, the mobile terminal may include a Global Positioning System (GPS) sensor for determining the location of the mobile terminal. The mobile terminal may also include a date and time sensor.

According to exemplary embodiments of the present invention, the mobile terminal 500 may be configured to define (e.g., associated and/or store) at least one preconfigured voicemail header and/or voicemail footer based on a user's input. According to exemplary embodiments of the present invention, each of the at least one preconfigured voicemail header and/or voicemail footer may be associated with at least one context during which the mobile terminal is to use the corresponding voicemail header and/or voicemail footer during transmission of a voicemail. Hereinafter, each component of the mobile terminal 500 will be explained in detail.

The audio processing unit 550 may be formed as an acoustic component. The audio processing unit 550 transmits and receives audio signals, and encodes and decodes the audio signals. For example, the audio processing unit 550 may include a CODEC and an audio amplifier. The audio processing unit 550 is connected to a Microphone (MIC) and a Speaker (SPK). The audio processing unit 550 converts analog voice signals inputted from the Microphone (MIC) into digital voice signals, generates corresponding data for the digital voice signals, and transmits the data to the controller 510. Further, the audio processing unit 550 converts digital voice signals inputted from the controller 510 into analog voice signals, and outputs the analog voice signals through the Speaker (SPK). Further, the audio processing unit 550 may output various audio signals generated in the mobile terminal 500 through the Speaker (SPK). For example, the audio processing unit 550 can output audio signals according to an audio file (e.g. MP3 file) replay, a moving picture file replay, and the like through the speaker. In particular, according to exemplary embodiments of the present invention, a user may define the at least one preconfigured voicemail header and/or voicemail footer using the audio processing unit 550. For example, the user may record a voicemail header and voicemail footer using the audio processing unit 550. Further, a caller may use the audio processing unit 550 during a call in order to leave the voicemail message content.

The input unit 540 may include input keys and function keys for receiving user input. For example, the input unit 540 may include input keys and function keys for receiving an input of numbers or various sets of letter information, setting various functions, and controlling functions of the mobile terminal 500. For example, the input unit 540 may include a calling key for requesting a voice call, a video call request key for requesting a video call, a termination key for requesting termination of a voice call or a video call, a volume key for adjusting output volume of an audio signal, a direction key, and the like. In particular, the input unit 540 according to exemplary embodiments of the present invention may transmit to the controller 510 signals related to an input for configuring a voicemail header and/or voicemail footer. Further, according to exemplary embodiments of the present invention, the input unit 540 may transmit to the controller 510 signals relating to selection of a voicemail header and/or voicemail footer to be used when leaving a voicemail. The user may use the input unit 540 to define the contexts in which a corresponding voicemail header and voicemail footer may be used. As another example, the user may use the input unit 540 to provide an indication as to when the caller has finished leaving the voicemail message content, or to hang up the call. Such an input unit 540 may be formed by one or a combination of input means such as a touch pad, a touchscreen, a button-type key pad, a joystick, a wheel key, and the like.

The display unit 530 displays information inputted by user or information to be provided to user as well as various menus of the mobile terminal 500. For example, the display unit 530 may provide various screens according to a user of the mobile terminal 500, such as an idle screen, a message writing screen, a calling screen, and the like. In particular, the display unit 530 according to exemplary embodiments of the present invention can display screen for configuring a voicemail header and/or voicemail footer stored on the mobile terminal 500. As an example, the display unit 530 can output an interface with which a user may interface to define the contexts in which a corresponding voicemail header and/or voicemail footer stored on the mobile terminal 500 is to be used. For example, the display unit 530 may display an interface which the user may manipulate or otherwise enter inputs via a touch screen to enter inputs for selecting or otherwise configuring a voicemail header and/or voicemail footer stored on the mobile terminal 500. The display unit 530 can be formed as a Liquid Crystal Display (LCD), an Organic Light Emitting Diode (OLED), an Active Matrix Organic Light Emitting Diode (AMOLED), and the like. However, exemplary embodiments of the present invention are not limited to these examples. Further, the display unit 530 can perform the function of the input unit 540 if the display unit 530 is formed as a touch screen.

The storage unit 520 can store user data, and the like, as well a program which performs operating functions according to an exemplary embodiment of the present invention. For example, the storage unit 520 may store a program for controlling general operation of a mobile terminal 500, an Operating System (OS) which boots the mobile terminal 500, and application program for performing other optional functions such as a camera function, a sound replay function, an image or video replay function, a Near Field Communication (NFC) function, and the like. Further, the storage unit 520 may store user data generated according to a user of the mobile terminal, such as, for example, a text message, a game file, a music file, a movie file, and the like. In particular, the storage unit 520 according to exemplary embodiments of the present invention may store a table which stores a mapping of voicemail headers and/or voicemail footers with corresponding contexts in which the voicemail headers and/or voicemail footers are to be used or transmitted during the leaving of a voicemail.

According to exemplary embodiments of the present invention, the mobile terminal 500 comprises at least one controller 510. The at least one controller 510 may control general operation of the mobile terminal 500. For example, the controller 510 may control operation of the various components or units included in the mobile terminal 500. The controller 510 may transmit a signal to the various components included in the mobile terminal 500 and control a signal flow between internal blocks of the mobile terminal 500. In particular, the controller 510 according to exemplary embodiments of the present invention can control to configure voicemail headers and/or voicemail footers based on inputs entered via the input unit 540. To this end, the controller 510 may determine whether the input entered via the input unit 540 corresponds to an input for configuring a voicemail header or a voicemail footer, determine whether an input corresponds to an input for indicating that the caller has finished leaving a voicemail message content, determine whether an input corresponds to an input for hanging up a call, and operatively transmitting a selected voicemail header and/or voicemail footer based on the associations or mappings stored in the storage unit 520.

A method for transmitting a voicemail from a mobile terminal according to exemplary embodiments of the present invention may be implemented in an executable program command form by various computer means and be recorded in a non-transitory computer readable recording medium. The computer readable recording medium may include a program command, a data file, and a data structure individually or a combination thereof. The program command recorded in a recording medium may be specially designed or configured for exemplary embodiments of the present invention, or may be known to a person having ordinary skill in a computer software field.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, a hardware device such as ROM, RAM, flash memory storing and executing program commands, and the like. Further, the program command includes a machine language code created by a compiler and a high-level language code executable by a computer using an interpreter. The foregoing hardware device may be configured to be operated as at least one software module to perform an operation of exemplary embodiments of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a voicemail from a mobile terminal, the method comprising:
   storing, by the mobile terminal, a voicemail header comprising predefined voicemail information;
   transmitting, by the mobile terminal, the voicemail header;
   receiving a voicemail message content from a user of the mobile terminal; and
   transmitting the voicemail message content,
   wherein the voicemail header is configurable by the user of the mobile terminal.

2. The method of claim 1, further comprising:
   transmitting a voicemail footer.

3. The method of claim 2, further comprising:
   receiving, from the user of the mobile terminal, an indication of an end of the voicemail message content,
   wherein the mobile terminal transmits the voicemail footer after the mobile terminal has received the indication of the end of the voicemail message content.

4. The method of claim 2, wherein the user of the mobile terminal is prompted to speak the voicemail message content after the mobile terminal has completed transmitting the voicemail header.

5. The method of claim 2, wherein the mobile terminal begins transmitting the voicemail message content after the mobile terminal has completed transmission of the voicemail header.

6. The method of claim 2, wherein the mobile terminal buffers the voicemail message content while the voicemail header is being transmitted.

7. The method of claim 6, wherein the mobile terminal begins transmitting the buffered voicemail message content after the mobile terminal has completed transmission of the voicemail header.

8. The method of claim 7, wherein the mobile terminal begins transmission of the buffered voicemail message content even if the mobile terminal is still buffering the voicemail message content.

9. The method of claim 6, wherein, after the user of the mobile terminal provides an indication for disconnecting the call, the mobile terminal continues to transmit at least one of the buffered voicemail message content and the voicemail footer until transmission of the voicemail footer is completed.

10. The method of claim 1, wherein the predefined voicemail information comprises the user's name and the user's callback number.

11. The method of claim 1, wherein the voicemail header to be transmitted may be selected among a plurality of predefined voicemail headers.

12. The method of claim 11, wherein the voicemail header to be transmitted may be selected by the user at the time of transmission of the voicemail.

13. The method of claim 11, wherein the voicemail header to be transmitted may be automatically selected by the mobile terminal based on a context.

14. The method of claim 13, wherein the plurality of predefined voicemail headers may be defined so as to correspond to a predefined context.

15. The method of claim 14, wherein the predefined context may be based at least in part on at least one of a contact, a contact group, a time of day, an environment in which the mobile terminal is present, data stored on the mobile terminal, data stored on a server, and user selection.

16. The method of claim 1, wherein the predefined voicemail information comprises at least one of date, time, and location.

17. A mobile terminal for transmitting a voicemail, the mobile terminal comprising:
   an input unit;
   an audio processing unit;
   a communication unit configured to transmit information to at least one of a recipient mobile terminal and a voicemail server; and
   at least one controller configured to store a voicemail header comprising predefined voicemail information, to transmit the voicemail header, to receive a voicemail message content from a user of the mobile terminal, and to transmit the voicemail message content,
   wherein the voicemail header is configurable by the user of the mobile terminal.

18. The mobile terminal of claim 17, wherein the at least one controller is further configured to transmit a voicemail footer.

19. The mobile terminal of claim 18, wherein the at least one controller is further configured to receive, from the user of the mobile terminal, an indication of an end of the voicemail message content, to transmit the voicemail footer after the mobile terminal has received the indication of the end of the voicemail message content.

20. The mobile terminal of claim 18, wherein the at least one controller is further configured to prompt the user of the mobile terminal to speak the voicemail message content after the mobile terminal has completed transmitting the voicemail header.

21. The mobile terminal of claim 18, wherein the at least one controller is configured to begin transmitting the voicemail message content after the mobile terminal has completed transmission of the voicemail header.

22. The mobile terminal of claim 18, wherein the at least one controller is configured to operatively buffer the voicemail message content while the voicemail header is being transmitted.

23. The mobile terminal of claim 22, wherein the at least one controller is configured to begin transmitting the buffered voicemail message content after the mobile terminal has completed transmission of the voicemail header.

24. The mobile terminal of claim 23, wherein the at least one controller is configured to begin transmission of the buffered voicemail message content even if the at least one controller is still buffering the voicemail message content.

25. The mobile terminal of claim 22, wherein the at least one controller is configured to continue transmission of at least one of the buffered voicemail message content and the voicemail footer until transmission of the voicemail footer is completed, after receiving from the user of the mobile terminal an indication for disconnecting the call.

26. The mobile terminal of claim 17, wherein the predefined voicemail information comprises the user's name and the user's callback number.

27. The mobile terminal of claim 17, wherein the voicemail header to be transmitted may be selected among a plurality of predefined voicemail headers.

28. The mobile terminal of claim 27, wherein the voicemail header to be transmitted may be selected by the user at the time of transmission of the voicemail.

29. The mobile terminal of claim 27, wherein the voicemail header to be transmitted may be automatically selected by the mobile terminal based on a context.

30. The mobile terminal of claim 29, wherein the plurality of predefined voicemail headers may be defined so as to correspond to a predefined context.

31. The mobile terminal of claim 30, wherein the predefined context may be based at least in part on at least one of a contact, a contact group, a time of day, an environment in which the mobile terminal is present, data stored on the mobile terminal, data stored on a server, and user selection.

32. The mobile terminal of claim 17, wherein the predefined voicemail information comprises at least one of date, time, and location.

33. A method for transmitting a voicemail from a mobile terminal, the method comprising:
storing, by the mobile terminal, a voicemail footer comprising predefined voicemail information;
transmitting the voicemail footer;
receiving a voicemail message content from a user of the mobile terminal; and
transmitting the voicemail message content,
wherein the voicemail footer is configurable by the user of the mobile terminal.

34. A method for transmitting a voicemail from a mobile terminal, the method comprising:
transmitting a voicemail message comprising predefined voicemail information,
wherein the voicemail message is entirely composed of predefined voicemail information such that a user of a mobile terminal is not required to record any portion of the voicemail message.

35. A method for transmitting a voicemail from a mobile terminal, the method comprising:
transmitting a voicemail message based on at least one predefined voicemail template configured by a user of the mobile terminal before an originating call from which transmission of the voicemail arises.

36. The method of claim 35, wherein the predefined voicemail template comprises at least one of a voicemail header and a voicemail footer.

37. The method of claim 36, wherein predefined voicemail template is configured so as to interleave the at least one of the voicemail header and the voicemail footer with a received voicemail message content that is spoken by the user of the mobile terminal.

38. The method of claim 35, wherein the predefined voicemail template comprises at least one portion that includes predefined voicemail information, and
wherein the predefined voicemail template is configured such that the voicemail message comprises the at least one portion including predefined voicemail information, and at least one portion including a received voicemail message content that is spoken by the user of the mobile terminal.

* * * * *